(12) United States Patent
Kinsel (10) Patent No.: US 6,990,806 B1
(45) Date of Patent: Jan. 31, 2006

(54) EXHAUST HEADER FOR INTERNAL COMBUSTION ENGINE

(76) Inventor: Jess Arthur Kinsel, 664 S. Roberts Rd., Graying, MI (US) 49738

( * ) Notice: Subject to any disclaimer, the term of this patent is extended or adjusted under 35 U.S.C. 154(b) by 45 days.

(21) Appl. No.: 10/653,490

(22) Filed: Sep. 2, 2003

(51) Int. Cl.
 *F02B 27/02* (2006.01)
(52) U.S. Cl. .................. 60/321; 60/320; 60/323; 60/313
(58) Field of Classification Search ............. 60/323, 60/298, 320, 313, 321
See application file for complete search history.

(56) References Cited

U.S. PATENT DOCUMENTS

| | | |
|---|---|---|
| 813,918 A | 2/1906 | Schmitz |
| 1,930,285 A | 10/1933 | Robinson |
| 2,798,695 A | 7/1957 | Arleque |
| 3,864,908 A * | 2/1975 | LaHaye .................. 60/272 |
| 4,373,329 A * | 2/1983 | Martini .................. 60/305 |
| 4,619,292 A | 10/1986 | Harwood |
| 4,854,381 A | 8/1989 | Mikula |
| 5,495,873 A | 3/1996 | Butkiewicz et al. |
| 5,740,772 A | 4/1998 | Bluma |
| 6,038,855 A * | 3/2000 | Markstrom et al. .......... 60/323 |
| 6,230,488 B1 | 5/2001 | Voss |
| 6,247,523 B1 | 6/2001 | Shibagaki et al. |

FOREIGN PATENT DOCUMENTS

JP 59176414 A * 10/1984

* cited by examiner

*Primary Examiner*—Thomas E. Denion
(74) *Attorney, Agent, or Firm*—Michael I Kroll (57) ABSTRACT

The present invention 10 discloses an exhaust header having heat sinks forming an integral part of the header conduit 14. The heat sinks are in the form of a plurality of radially positioned longitudinal fins 20 extending between the distal ends of the exhaust header 26. The extruded fins 20 welded at 24 to the engine exhaust conduits 14 tapering at 22 toward the flange 16 which is fixedly attached to the engine. At the other distal end a large, three-inch collector 18 is disposed having a rotating flange 30 with apertures 32 therein which flange encircles the collector. In an alternative embodiment, breaks 28 are provided in the fins. The present invention 10 is designed to improve cooling efficiency, reduce engine compartment temperature and provide greater overall structural integrity of the header pipes.

4 Claims, 8 Drawing Sheets

EXHAUST HEADER FOR INTERNAL COMBUSTION ENGINE

BACKGROUND OF THE INVENTION

1. Field of the Invention

The present invention relates generally to exhaust headers and, more specifically, to an exhaust header having heat sinks forming an integral part of said header. The heat sinks are in the form of a plurality of radially positioned longitudinal fins extending between the distal ends of the exhaust header.

The present invention has a stainless steel construction with extruded fins welded to the engine exhaust conduits tapering toward the flange, which is fixedly attached at one distal and at the other distal end a large three inch collector is attached having a rotating flange with aperture encircling the collector. The device is designed to improve cooling efficiency, reduce engine compartment temperature and provide greater overall structural integrity of the header pipes.

The present invention having integral heat dissipation members is designed for high performance internal combustion engines. The heat dissipation can be increased or decreased dependant upon the number of integral fins. The total heat dissipation "Q" can be calculated as the dissipation per fin times the number of fins $$Q_{Total} = nQ$$

Where, $Q_{Total}$=Total heat dissipation.

Additionally, the heat dissipating fins form spacer elements that prevent engine component from contacting the exhaust manifold.

In the present invention cooling fins further comprises a "U" shaped channel having a channel thickness wherein the base is a rectangular base with the pair of upright arms extending therefrom with the other upright arm of the pair of upright arms having an upper edge spaced from the base.

In the present invention the fins will be reduced at bends and removed at joints and there is ample clearance for spark plugs. All of the pipes having fins join at one point where a collector is attached. The collector has a movable flange for mating to an exhaust system with the collector sized to accommodate the number of exhaust pipes.

The present invention is one of the easiest bolt-on accessories you can use to decrease the temperature within the engine compartment.

2. Description of the Prior Art

There are other exhaust headers designed for evacuation of exhaust gases. Typical of these is U.S. Pat. No. 813,918 issued to A. Schmitz on Feb. 27, 1906.

Another patent was issued to R. H. Robinson on Oct. 10, 1933 as U.S. Pat. No. 1,930,285. Yet another U.S. Pat. No. 2,798,695 was issued to W. S. Arleque on Jul. 9, 1957 and still yet another was issued on Feb. 4, 1975 to Heath as U.S. Pat. No. 3,863,445.

Another patent was issued to Hardwood on Oct. 28, 1986 as U.S. Pat. No. 4,619,292. Yet another U.S. Pat. No. 4,854,381 was issued to Mikula on Aug. 8, 1989. Another was issued to Voss on May 15, 2001 as U.S. Pat. No. 6,230,488 B1 and still yet another was issued on Mar. 5, 1996 to Butkiewicz, et al., as U.S. Pat. No. 5,495,873.

U.S. Pat. No. 813,918

Inventor: A Schmitz

Issued: Feb. 27, 1906

The invention relates to improvements in tubes having longitudinal ribs or wings. Tubes of this kind are well known and are particularly employed on an extensive scale as heating or cooling tubes or n boilers. The two edges of the skelp from which these tubes are formed are joined together by the so-called "overlapped" welding, and since the joint thus formed extends the full length of the tubes the said tubes are weak at this place and do not offer sufficient security against their breaking by the high steam pressures now in use and at their employment in steam super heaters.

U.S. Pat. No. 1,930,285

Inventor: R. H. Robinson

Issued: Oct 10, 1933

The invention relates to metallic tubing and other skeletonized metal frames and assembled metal members, having a general application in manufacturing arts, but particularly concerned with structures where exceptional strength with minimum weight are essential, such as aero plane and dirigible construction, metal rackets for tennis, squash and kindred sports, metal shafts for golf, etc and while applicable to other metals is particularly concerned with the use of modern steel alloys of high tensile strength obtained through heat treating process, and the metallic or molecular uniting or various elements of a built up metal structure in an inexpensive manner, while simultaneously bringing out the physical properties of the metal obtainable through heat treating.

U.S. Pat. No. 2,798,695

Inventor: W. S. Arleque

Issued: Jul. 9, 1957

The invention relates to lubricant cooling devices, more particularly, the invention has reference to a device adapted to be formed either as an attachment to or as a permanent part to or as a permanent part of an oil filter or strainer used on internal combustions, particularly automobile engines.

The oil filter of automobile and other internal combustion engines are mounted in exposed positions in most instances, this being particularly true of the later model automobiles. During operation of the vehicle, oil flows through the filter continuously, and in view of the exposed positions of the filter and the desirability for providing a means adapted to affect a positive cooling action as regards the flowing lubricant, it is proposed, in carrying out the present invention.

U.S. Pat. No. 3,863,445

Inventor: Heath

Issued: Feb. 4, 1975

External baffles are attached to hot portions of conduits in catalytic emission control exhaust systems to provide means to protect and shield the surrounding environment and dissipate heat.

U.S. Pat. No. 4,619,292

Inventor: Hardwood

Issued: Oct. 28, 1986

An air gap pipe and a method for forming the same are provided. The air gap pipe includes a non-linear outer pipe and an inner pipe of identical configuration disposed concentrically within the outer pipe. The inner pipe is supported by resilient dimples in the outer pipe. The outer pipe is placed in a condition of receiving the inner pipe by longitudinally cutting the outer pipe in half with a pre programmed plasma arc or laser cutting apparatus. The two halves or the outer pipe are secured together to provide vents, if necessary, for selective dissipation of heat.

U.S. Pat. No. 4,854,381

Inventor: Mikula

Issued: Aug. 8, 1989

A unique heat exchanger device that is mounted in the flue of a forced air furnace is disclosed. Pluralities of copper tubes are retained in a substantially parallel and equidistant relationship by means of end plates. Pluralities of circular metallic fins are positioned on the copper tubes and serve as heat radiating surfaces. Cross tubes are provided within the copper tubes permitting the passage of heated air there through. The tube assembly is covered by a perforated shroud permitting air at room temperature to pass there through and to circulate among the heated copper tubes. An exhaust manifold is provided on the perforated shroud to permit connection of the device to the cold air return.

U.S. Pat. No. 6,230,488 B1

Inventor: Voss

Issued: May 15, 2001

An exhaust gas cooling system for a vehicle includes a cooling fin system retrofit and a side exhaust pipe retrofit having an exhaust gas exit pipe having a first portion having a plurality of mixing portions which are either bends or internal mixing fins configured to mix vehicle exhaust gas, but not to restrict exhaust gas flow, a second portion fastened to the first portion and a chrome coated third portion fastened to the second portion and extending along the side of the vehicle. The cooling fin system retrofit includes an adjustable clamp and one or more cooling fins, each cooling fin having a base having a pair of upstanding arms, with one arm of the pair having a lip of engaging an arm of another cooling fin. An exhaust gas cooling system kit, a side exhaust pipe retrofit kit, and a cooling fin kit are included.

U.S. Pat. No. 5,495,873

Inventor: Butkiewicz, et al.

Issued: Mar. 5, 1996

An acoustically improved, air gap engine exhaust conduit having a dual wall, air gap, metal exhaust conduit of an outer jacked and a thin inner liner, the jacket having at least one exhaust gas inlet and an exhaust gas outlet, the liner having at least one inlet and an outlet, the jacket inlet and liner inlet being adjacent each other, the liner being secured to the jacket adjacent the jacket inlet and the liner inlet, the liner outlet being optionally in engagement with the jacket, and the liner otherwise being spaced from the jacket over its length to form a continuous air gap from the liner inlet to the liner outlet, a pattern of indentation ribs protruding into or out of the jacket over substantially all of said jacked, each indentation rib protruding toward or away from the liner, and termination short of the liner to be spaced from and not engagement with the liner, to maintain the continuous air gap. Optionally, the liner can have a pattern of indentation ribs protruding inwardly or outwardly and, if the latter, terminating short of the jacket so as not to engage the jacket and leave an air gap over the length thereof.

U.S. Pat. No. 5,740,772

Inventor: Bluma

Issued: Apr. 21, 1998

A oil filter cooler involves a semi circular or u shaped metal device which simply "snaps" onto an oil filter due to the fact that it is slightly flexible, the device having radially extending fins extending outward which enable this device to draw heat away from the oil filter on which it is attached.

U.S. Pat. No. 6,247,523

Inventor: Shibagaki, et al.

Issued: Jun. 19, 2001

An exhaust gas heat exchanger include exhaust gas tubes through which exhaust gas generated by a combustion flows and cooling water tubes through which cooling water for cooling exhaust gas flows. Plural segments of offset fins are disposed within each exhaust gas tube to be arranged staggeringly in a tube longitudinal direction. The cooling water tubes communicate with each other through cooling water communication passages disposed on both end sides of each exhaust gas tube in the tube longitudinal direction at diagonal positions when being viewed from a minor diameter direction of each exhaust gas tube. The segments are tilted relative to the tube longitudinal direction toward a side opposite to a diagonal line (L1) connecting the cooling water communication passages. Thus, a cross angle between the tilt direction of the segments and a main flow of the exhaust gas becomes smaller, and a pressure loss in the exhaust gas tubes is reduced. While these devices for improvement of an engine's performance may be suitable for the purposes for which they were designed, they would not be as suitable for the purposes of the present invention, as hereinafter described.

SUMMARY OF THE PRESENT INVENTION

The present invention discloses an exhaust header having heat sinks forming an integral part of the header conduit. The heat sinks are in the form of a plurality of radially positioned longitudinal fins extending between the distal ends of the exhaust header. The extruded fins are welded to the engine exhaust conduits and taper near the flange which is fixedly attached to the engine. At the other distal end a large three-inch collector is disposed having a rotating flange with apertures encircling the collector. In an alternative embodiment, breaks are provided in the fins. The present invention is designed to improve cooling efficiency, reduce engine compartment temperature and provide greater overall structural integrity of the header pipes.

A primary object of the present invention is to reduce engine compartment temperature.

Another object of the present invention is to provide an exhaust header having means for dissipating heat.

Yet another object of the present invention is to provide an exhaust header having fins extending therefrom.

Still yet another object of the present invention is to provide an exhaust header having fins radially positioned extending longitudinally along said exhaust header.

Additional objects of the present invention will appear as the description proceeds.

The present invention overcomes the shortcomings of the prior art by providing an exhaust manifold having fins for heat dissipation radially positioned extending longitudinally from one distal end to the other.

In addition, said fins forming spacer elements to prevent engine compartment components from contacting the exhaust manifold.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
10 present invention
12 engine
14 conduit
16 flange
1 8 collector
20 fins
22 taper
24 weld
26 header
28 break in fin
30 flange
32 bolt aperture

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
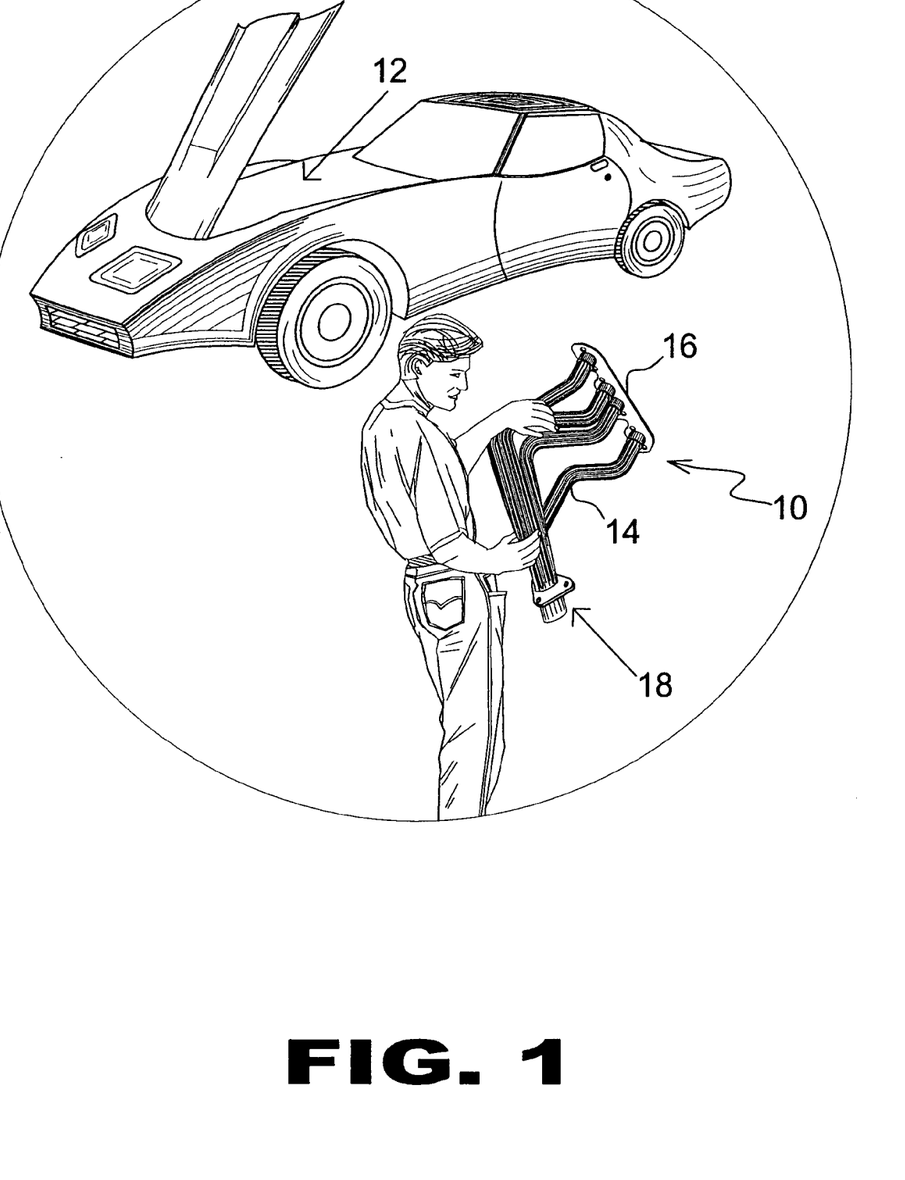
FIG. 1 is an illustrative view of present invention.

Turning to FIG. 1, shown therein is an illustrative view of present invention 10 being an exhaust header for small and large block gasoline engines 12 having a stainless steel construction with extruded fins welded to the engine exhaust conduits 14 that taper toward the flange 16 which is fixedly attached to the engine at one distal end and at the other distal end a large, three-inch collector 18 is provided having a rotating flange encircling the collector with apertures therein. The device 10 is designed to improve cooling efficiency, reduce under hood temperature and provide greater overall structural integrity of the header pipes.

Figure 2:
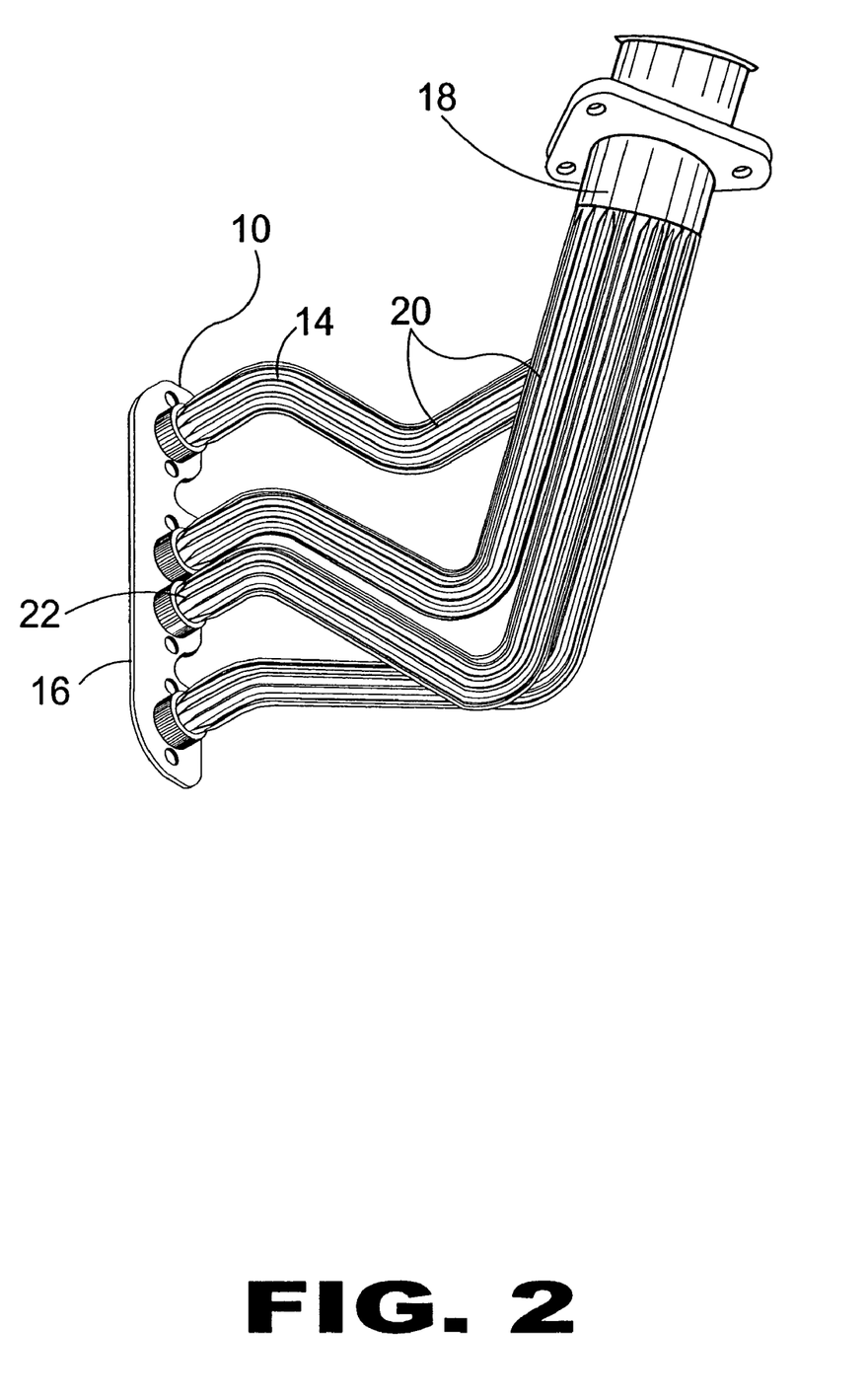
FIG. 2 is a perspective view of present invention.

Turning to FIG. 2, shown therein is a perspective view of the present invention 10 being an exhaust header having a stainless steel construction with extruded fins 20 welded to the exhaust conduits 14 that taper at 22 toward the flange 16 which is fixedly attached to the conduits at one distal end and to a three-inch collector 18 at its other distal end.

Figure 3:
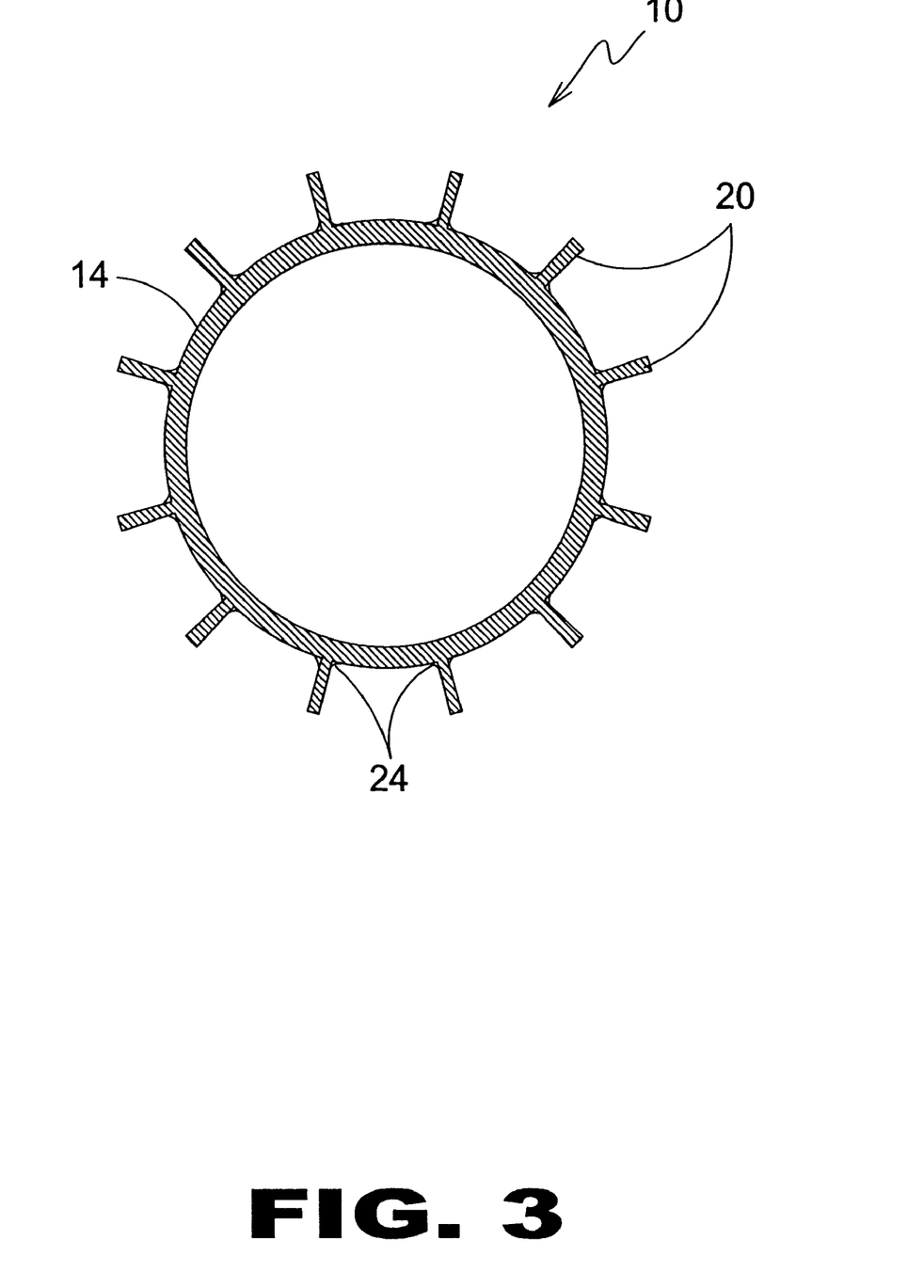
FIG. 3 is a sectional view of present invention.

Turning to FIG. 3, shown therein is a sectional view of the present invention 10. Shown is a sectional cut of one of the header conduits 14 of the present invention 10 having fins 20 welded at 24 to the conduit that taper toward the flange as previously explained providing improved cooling efficiency, reduced under hood temperature and improved overall structural integrity of the header pipes.

Figure 4:
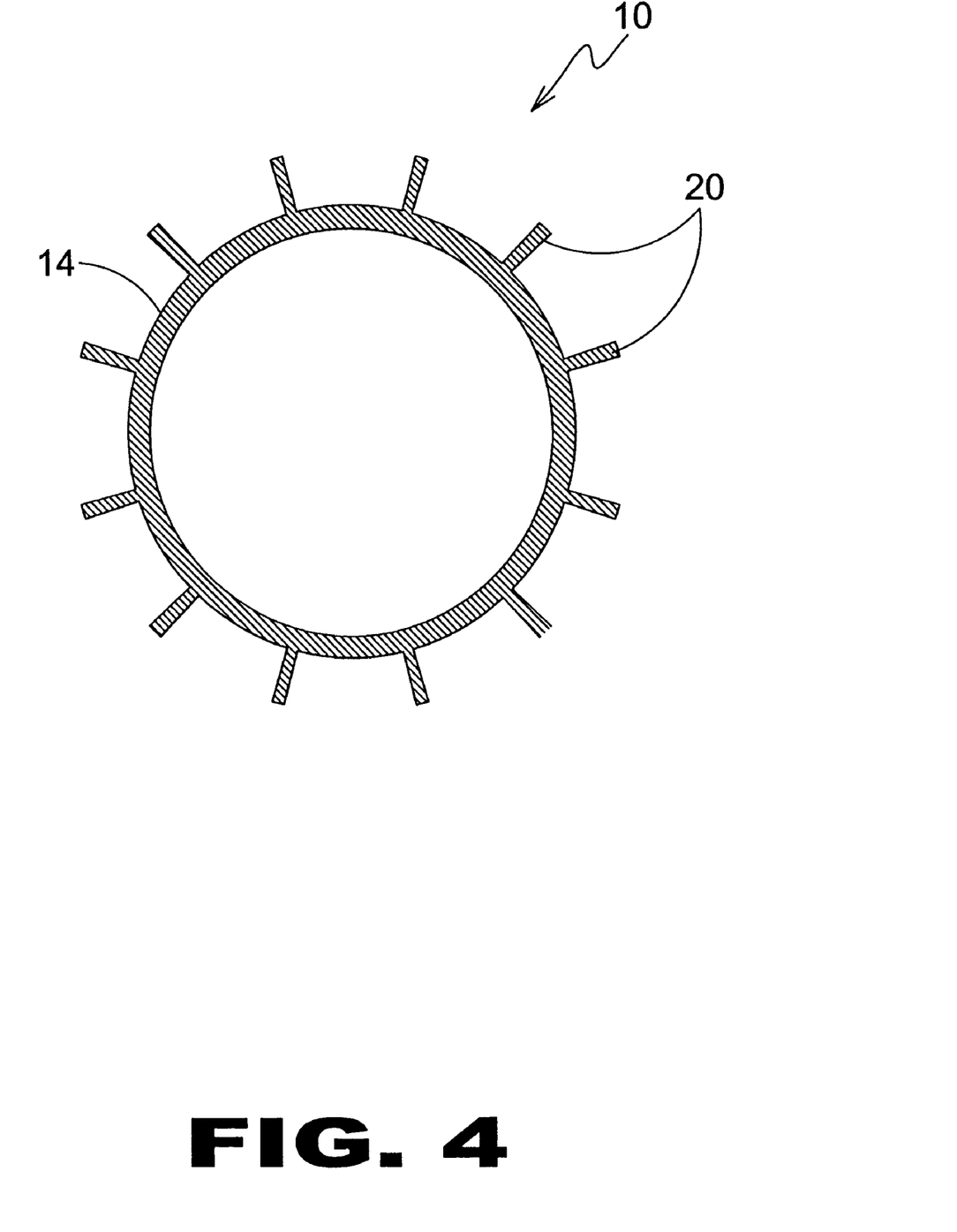
FIG. 4 is a sectional view of present invention.

Turning to FIG. 4, shown therein is a sectional view of the present invention 10. Shown is a sectional cut of one of the header conduits 14 of the present invention 10 having extruded fins 20 attached to the conduit that taper toward the flange as previously explained providing improved cooling efficiency, reduced under hood temperature and improved overall structural integrity of the header pipes.

Figure 5:
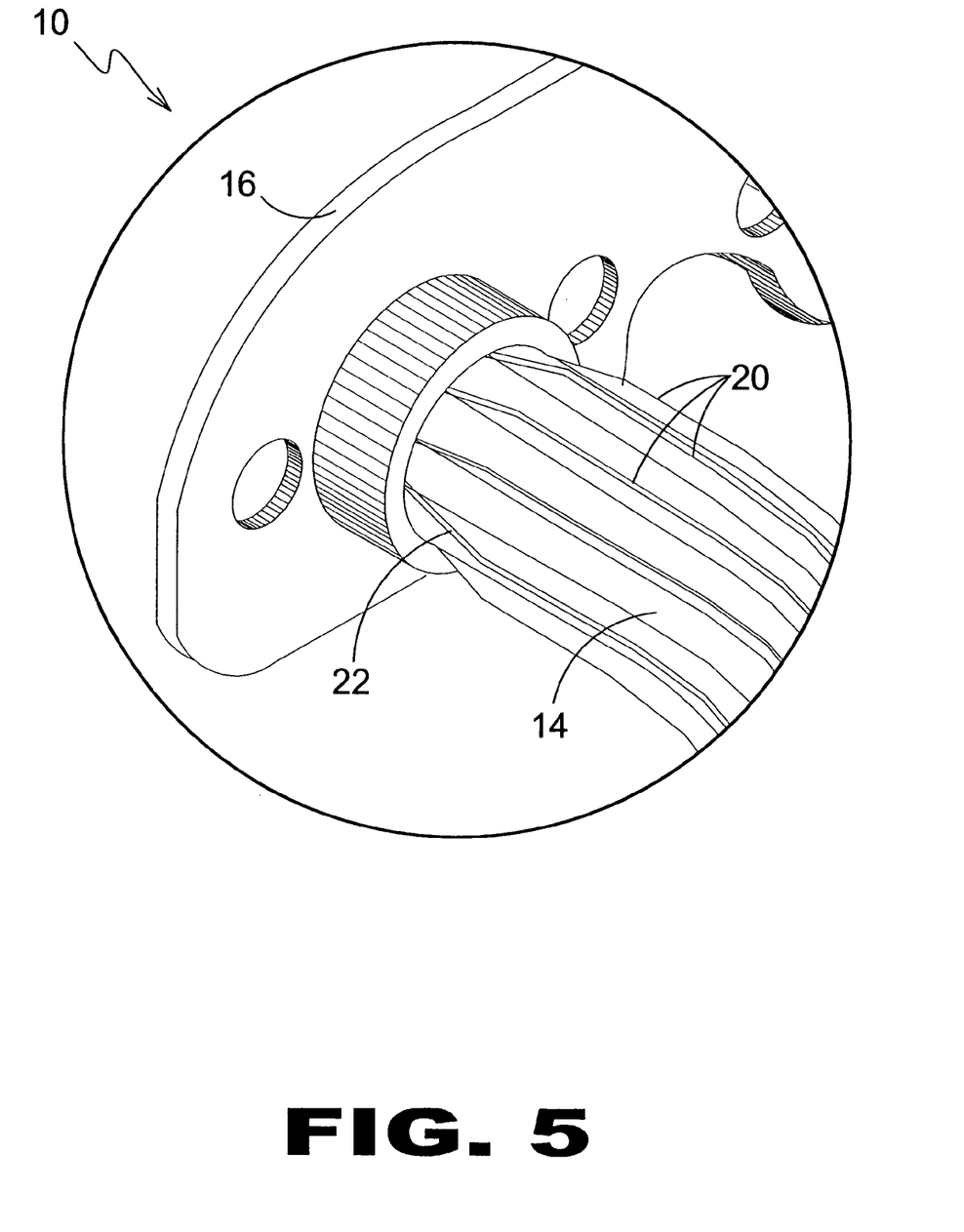
FIG. 5 is a detailed view of present invention.

Turning to FIG. 5, shown therein is a detailed view of the present invention 10. Shown is a detailed view of one of the stainless steel header conduits 14 of the present invention 10 having fins 20 welded to the conduit that taper at 22 toward the flange 16 that provide improved cooling efficiency, reduced under hood temperature and improved overall structural integrity of the header pipes.

Figure 6:
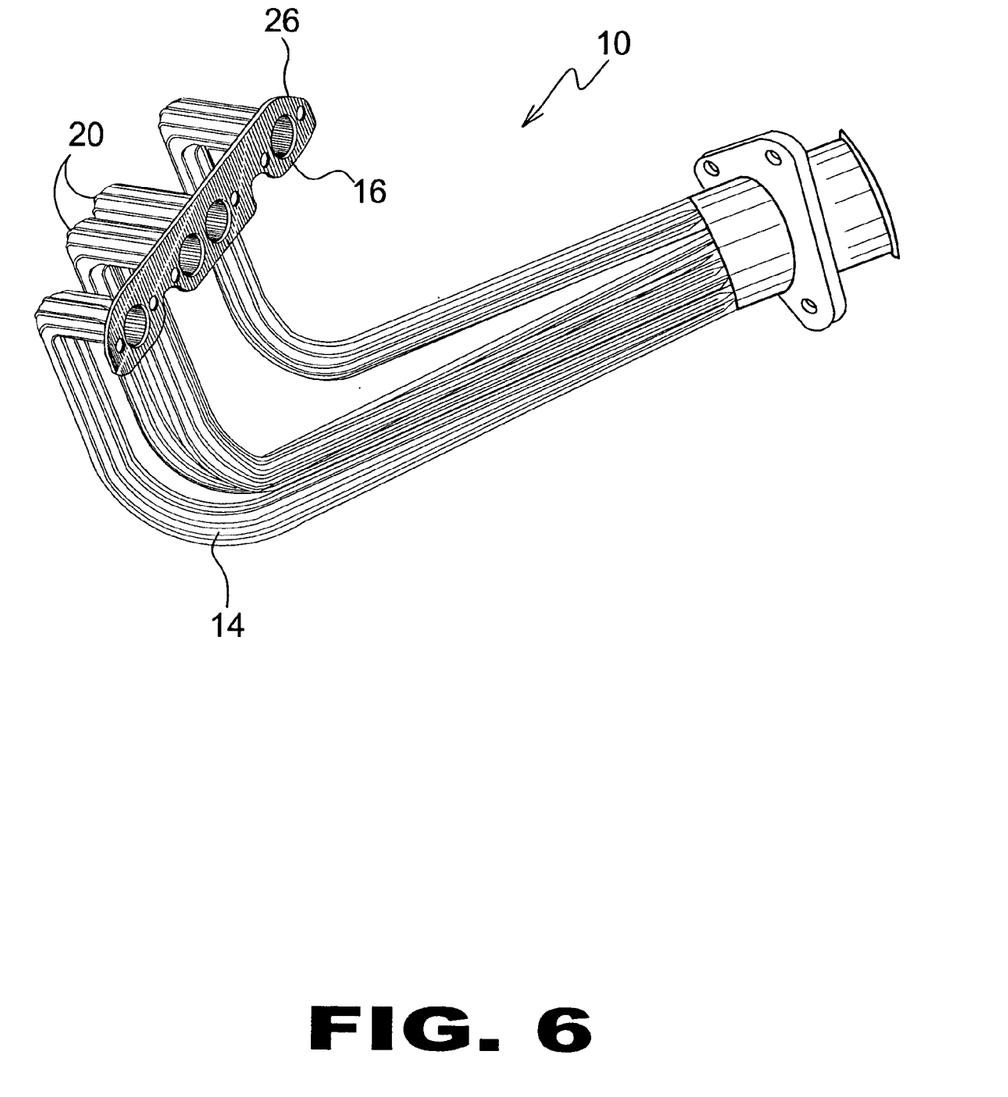
FIG. 6 is a rear perspective view of present invention.

Turning to FIG. 6, shown therein is a rear perspective view of the present invention 10. Shown is a rear view of the present invention 10 being an exhaust header 26 for small and large gasoline engines having a stainless steel construction having fins 20 welded to the conduit 14 that taper toward the flange 16 providing improved cooling efficiency, reduced under hood temperature and improved overall structural integrity of the header pipes.

Figure 7:
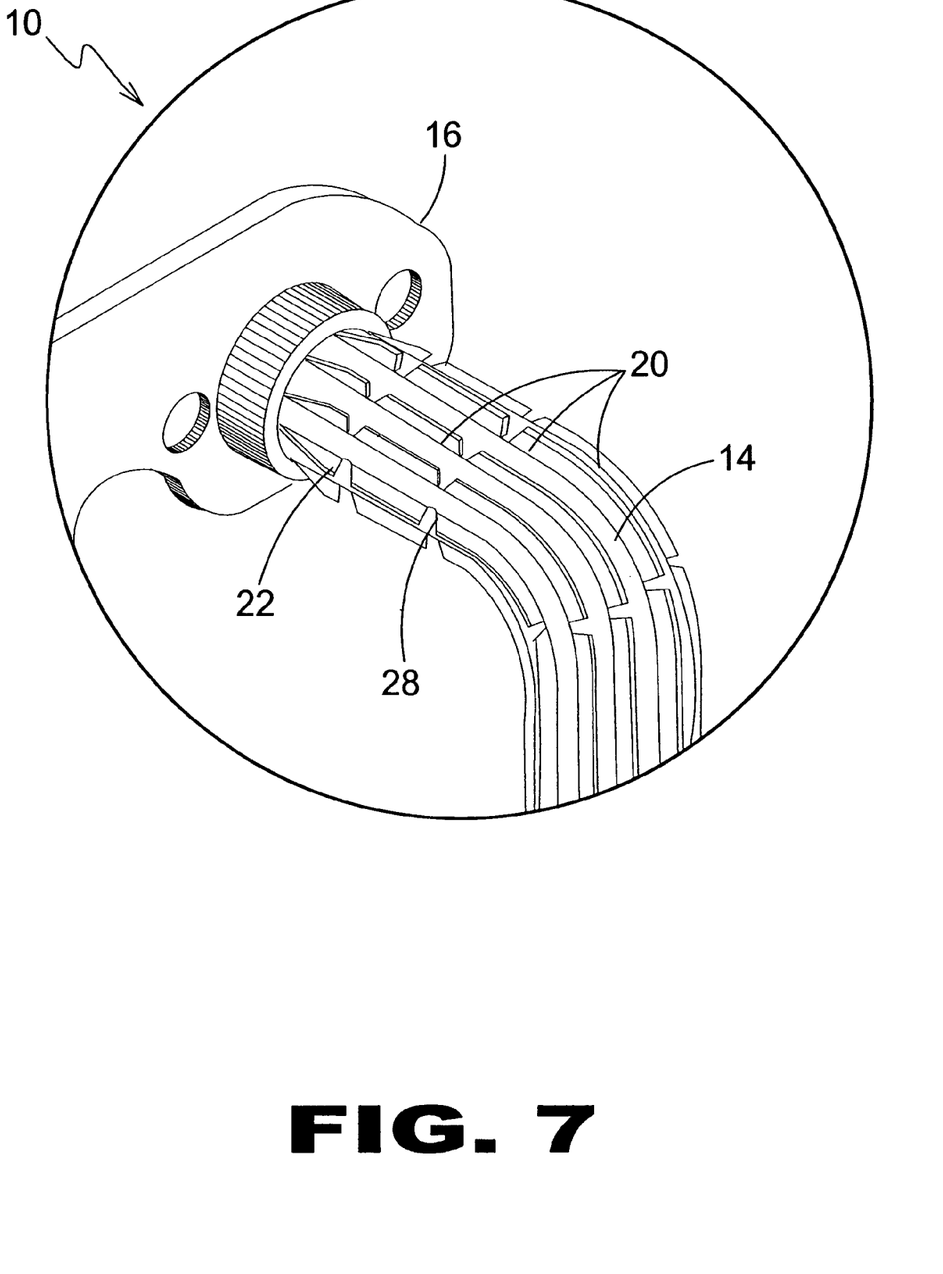
FIG. 7 is an enlarged view of additional element of present invention.

Turning to FIG. 7, shown therein is an enlarged view of an additional element of the present invention 10. Shown is a detailed view of the present invention 10 being an exhaust header for small and large gasoline engines having a stainless steel construction having fins 20 with breaks therein at 28 and welded to the conduit 14 that taper at 22 toward the flange 16 providing improved cooling efficiency, reduced under hood temperature and improved overall structural integrity of the header pipes.

Figure 8:
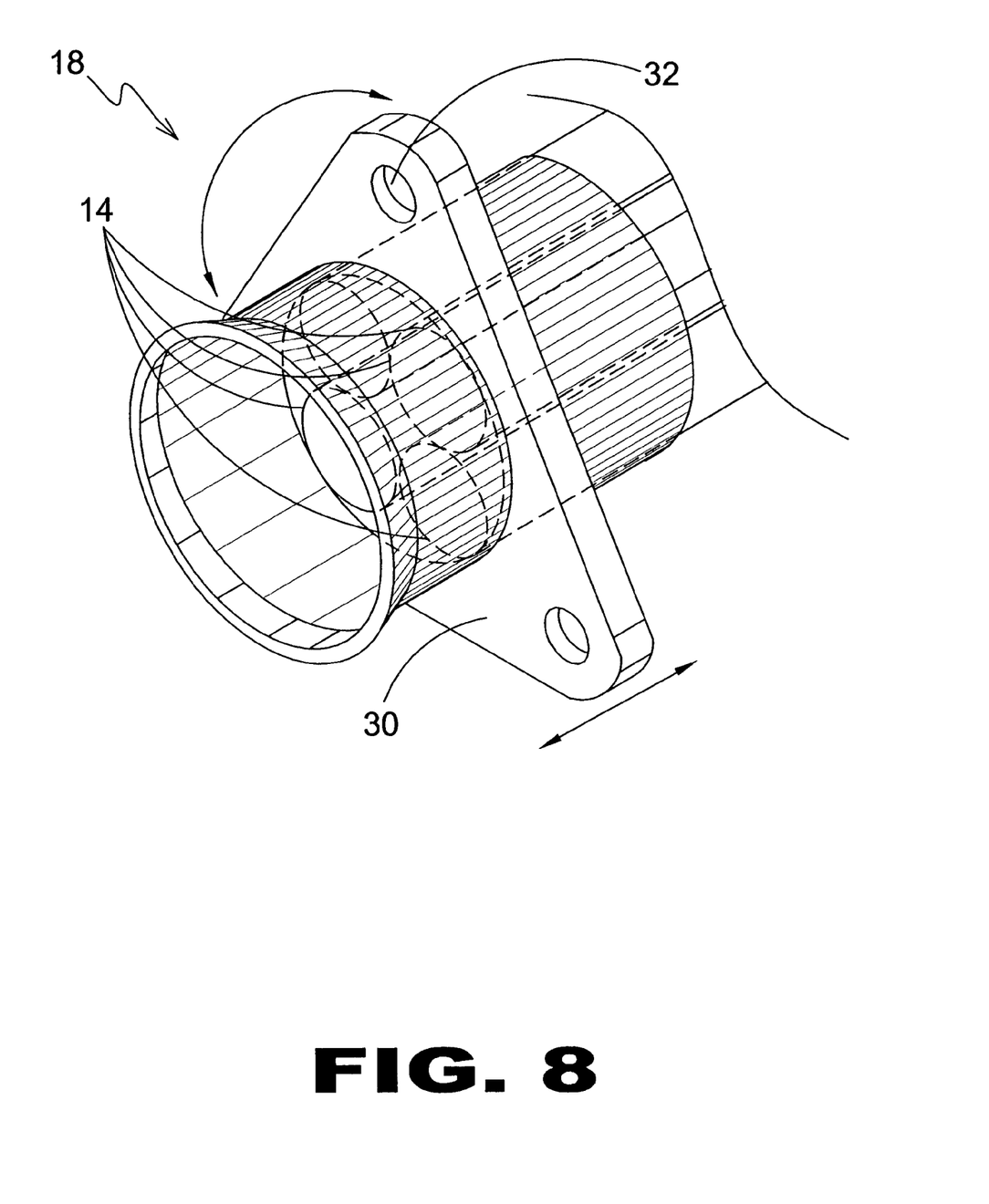
FIG. 8 is a detail view of the collector.

Turning to FIG. 8, shown therein is a detail view of the collector 18 of the present invention. Shown is the cylindrical collector 18 of the present invention which forms a sleeve-like member for attachment to an exhaust system. Four exhaust pipe conduits 14 are shown in FIG. 8 which extend from the performance exhaust header. The flange 30 design with bolt aperture 32 therein varies as the number of exhaust pipe conduits 14 vary. The flange 30 which surrounds the collector 18 has means thereon for rotating and sliding longitudinally along the collector 18.

What is claimed to be new and desired to be protected by Letters Patent is set forth in the appended claims.

I claim:

1. An exhaust header for an internal combustion engine, comprising:
   a) a flange for attachment of the exhaust header to the engine, said flange having first and second sides wherein said first side is disposed contiguous to said engine:
   b) a plurality of conduits having first and second ends wherein each of said first ends are connected to said second side of said flange and each of said second ends extend away from the engine;
   c) a plurality of fins disposed in a spaced apart relationship about the periphery of each of said conduits wherein said fins extend radially from said conduits and longitudinally from substantially said first end to substantially said second end of said conduits to permit heat to be dissipated away from the exhaust header;
   d) a collector for receiving each of said second ends of said conduits therein, wherein said collector forms a cylindrical sleeve about said conduits for attachment to an exhaust system, said collector being about three inches in diameter for receiving a plurality of conduits and is sized to receive four of said conduits therein to permit the collector to be used with an exhaust header for use with four cylinders of an engine; and
   e) a collector flange disposed about said collector, said collector flange having collector to an exhaust system, wherein each of said fins is substantially perpendicular to each of said conduits, said fins are extruded to permit the fins to be easily manufactured and the height of said fins taper toward said first and second ends of said conduits to permit said first and second ends to be easily joined to other components and the fins have breaks therein, wherein said breaks in said fins are spaced apart longitudinally along said fins.

2. The exhaust header of claim 1, wherein said fins are welded onto said conduits to permit the fins to be secured to the conduits.

3. The exhaust header of claim 1, wherein said fins are reduced in height in the bends of said conduit.

4. The exhaust header of claim 3, wherein said conduits further comprise joints disposed therein between sections of said conduits, wherein said fins taper toward said joints to permit the joints to be easily joined together.

* * * * *